United States Patent
Noebauer

(10) Patent No.: US 9,537,400 B2
(45) Date of Patent: Jan. 3, 2017

(54) SWITCHING CONVERTER WITH DEAD TIME BETWEEN SWITCHING OF SWITCHES

(71) Applicant: Infineon Technologies Austria AG, Villach (AT)

(72) Inventor: Gerhard Noebauer, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/473,852

(22) Filed: Aug. 29, 2014

(65) Prior Publication Data
US 2016/0065065 A1   Mar. 3, 2016

(51) Int. Cl.
 *H02M 3/158*   (2006.01)
 *H02M 1/38*   (2007.01)
 *H02M 1/00*   (2006.01)

(52) U.S. Cl.
 CPC ............ *H02M 3/1588* (2013.01); *H02M 1/38* (2013.01); *H02M 2001/0009* (2013.01)

(58) Field of Classification Search
 CPC ............... H02M 3/158; H02M 3/1588; H02M 2001/0009; H02M 1/38
 USPC ......................................... 323/271, 282–285
 See application file for complete search history.

(56) References Cited

U.S. PATENT DOCUMENTS

| | | | | |
|---|---|---|---|---|
| 8,242,813 B1 * | 8/2012 | Wile | ...................... | G01R 19/25 323/284 |
| 2006/0164867 A1 * | 7/2006 | Dikken | ................... | H02M 1/38 363/13 |
| 2007/0085520 A1 * | 4/2007 | Ho | ....................... | H02M 3/1588 323/282 |
| 2007/0109822 A1 | 5/2007 | Kuan | | |
| 2010/0002472 A1 * | 1/2010 | Brohlin | ................. | H02M 3/158 363/21.1 |
| 2010/0013451 A1 * | 1/2010 | Nakamura | .......... | H02M 3/1588 323/282 |
| 2014/0043004 A1 * | 2/2014 | Abramov | ............ | H02M 3/1588 323/283 |
| 2014/0320104 A1 * | 10/2014 | Guo | ........................ | H02M 1/14 323/290 |
| 2015/0145331 A1 * | 5/2015 | Monier | ................... | H02M 1/14 307/26 |

* cited by examiner

*Primary Examiner* — Jue Zhang
*Assistant Examiner* — Lakaisha Jackson
(74) *Attorney, Agent, or Firm* — Slater Matsil, LLP

(57) ABSTRACT

A device and method for operating a switching power converter are disclosed. In an embodiment a circuit includes a switching power converter having a half bridge including a high-side semiconductor switch connected to a low-side semiconductor switch and an inductor coupled to a half-bridge output node. The circuit further includes a control circuit configured to generate drive signals to switch the high-side semiconductor switch and the low-side semiconductor switch on and off, wherein the drive signals are generated to ensure a dead time between a switch-off of the low-side switch and a subsequent switch-on of the high side switch, and wherein the dead time is set to a first value, when an inductor current is negative at a time of switching, and the dead time is set to a second value, which is lower than the first value, when the inductor current is positive at the time of switching.

22 Claims, 5 Drawing Sheets

SWITCHING CONVERTER WITH DEAD TIME BETWEEN SWITCHING OF SWITCHES

TECHNICAL FIELD

The present disclosure relates to the field of switching converters and switched mode power supplies.

BACKGROUND

Switched-mode power supplies (SMPS) are commonly used and increasingly replacing "classical" power supplies composed of a transformer and a linear voltage regulator. SMPS use switching power converters to convert one voltage (e.g. a DC voltage provided by a battery) into another voltage, which may be used as supply voltage for an electric device or an electronic circuit. For example, switching power converters are widely used to convert a comparably high battery voltage of, for example, 12 volts to a lower voltage of, for example, 3.3 V. Such low voltages are needed to supply digital circuitry and signal processors used in automobiles or mobile devices such as mobile phones, portable computers, etc.

In many applications, high energy conversion efficiency is desired throughout a wide range of output currents. At high output currents, the predominant cause of losses is the on-state resistance of the semiconductor switches (power transistors) used in the switching power converter. The on-state resistance is basically inversely proportional to the active area of the power transistor. For a specific application, a minimum chip area can be calculated for a given desired on-state resistance or for a desired energy conversion efficiency.

Generally, larger transistors (with a larger active area) have lower on-state resistances and therefore allow higher energy conversion efficiency for high output currents. However, larger transistors entail higher intrinsic capacitances, which adversely affect the energy conversion efficiency. At low output currents, the predominant cause of losses is the charging and discharging of the intrinsic capacitances of the power transistors. As a consequence, the circuit designer faces a conflict of objectives, as a high energy conversion efficiency at high output currents (i.e. at full load) is detrimental for a high energy conversion efficiency at low output currents (i.e. at light load); and many circuits operate at low currents (stand-by, power saving mode, etc.) for most of the time.

For switching converters with a synchronous rectifier the dead time between the switch-off of the low side-switch and a subsequent switch-on of the high-side switch (and vice versa) is also relevant to power losses and thus modern driver circuits may control the operation of the switching power converter such that the mentioned dead time is (approximately) at a minimum. However, a minimum deadtime is needed to avoid cross-conduction.

SUMMARY

A control circuit for controlling the operation of a switching power converter is described. The switching power converter includes a high-side semiconductor switch and a low-side semiconductor switch, which are connected to form a half bridge, and an inductor, which is coupled to an output node of the half-bridge. In accordance with one example of the invention, the control circuit is configured to generate drive signals to switch both, the high-side semiconductor switch and the low-side semiconductor switch, on and off in accordance with a given control law. The drive signals are generated to ensure a dead time between a switch-off of the low-side switch and a subsequent switch-on of the high side switch. The dead time is set to at least a first value, when an inductor current is negative at the time of switching, and the dead time is set to a second value, which is lower than the first value, when the inductor current is positive at the time of switching.

The low side semiconductor switch may be composed of a low side-transistor and an auxiliary transistor, which is coupled parallel to the low side transistor. In accordance with another example of the invention the control circuit is configured to generate drive signals to switch the high-side semiconductor switch and the low-side transistor on and off in accordance with a given control law to operate the switching converter in at least one of: continuous conduction mode (CCM) and discontinuous conduction mode (DCM). When operating in CCM, the drive signals are generated to ensure a dead time between a switch-off of the low-side transistor and a subsequent switch-on of the high side switch. The dead time is set to at least a first value, when an inductor current is negative at the time of switching, and the dead time is set to a second value, which is lower than the first value, when the inductor current is positive at the time of switching. Alternatively, when operating in DCM and the inductor current is substantially zero, a drive signal is generated to switch on the auxiliary transistor for a given time interval, thus causing the inductor current to become negative. The drive signals are generated to ensure a dead time of at least the first value between a switch-off of the auxiliary transistor and a subsequent switch-on of the high side switch.

Furthermore, a method for operating a switching power converter is described. The power converter includes a high-side semiconductor switch and a low-side semiconductor switch connected to form a half bridge and an inductor coupled to a half-bridge output node. In accordance with one example of the invention the method comprises generating drive signals to switch the high-side semiconductor switch and the low-side semiconductor switch on and off in accordance with a given control law. The drive signals are generated to ensure a dead time between a switch-off of the low-side switch and a subsequent switch-on of the high side switch. The dead time is set to at least a first value, when an inductor current is negative at the time of switching, and the dead time is set to a second value, which is lower than the first value, when the inductor current is positive at the time of switching.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
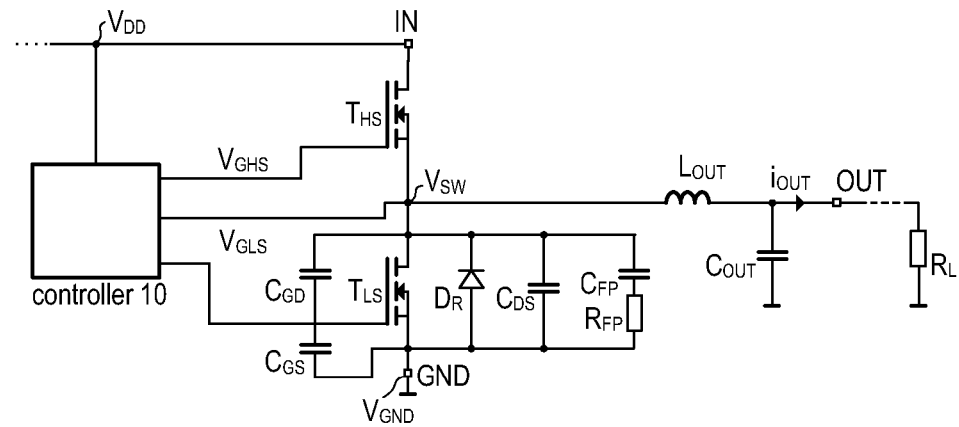
FIG. 1 illustrates one exemplary switched mode power supply (SMPS) circuit including a buck converter with a synchronous rectifier.

FIG. 1 shows a switched mode power supply (SMPS) circuit including buck converter as an illustrative example for a switching power converter and a controller circuit 10. The buck converter includes two semiconductor switches $T_{HS}$, $T_{LS}$, which are connected to form a half-bridge. Accordingly, the semiconductor switch $T_{HS}$ (high-side switch) is connected between an input terminal IN, at which an input voltage $V_{IN}$ is applied, and a half-bridge output node. The semiconductor switch $T_{LS}$ (low-side switch) is connected between the half-bridge output node and a ground terminal GND, which is coupled with a reference potential $V_{GND}$ (ground potential). The half-bridge output node is coupled to the power converter output terminal OUT via an inductor $L_{OUT}$, and an output capacitor is electrically connected between the output terminal and the reference potential $V_{GND}$ to buffer the output voltage $V_{OUT}$ provided at the output terminal OUT.

In the present example, the semiconductor switches $T_{HS}$ and $T_{LS}$ are implemented as power MOS field effect transistors (MOSFETs). The drain-source current paths of the transistors $T_{HS}$ and $T_{LS}$ are connected in series to form the half-bridge as mentioned above. The gate electrodes of the transistors $T_{HS}$ and $T_{LS}$ are connected to a controller circuit 10, which is configured to control the switching operation of the switching power converter. The controller 10 may also be supplied by the input voltage $V_{DD}$ and coupled to the ground terminal GND. However, a different supply voltage may be used to operate the controller 10. Dependent on the control law implemented in the controller 10, one or more feed-back signals may be fed back to the controller. For example, the voltage $V_{SW}$ present at the half-bridge output node (or any signal representing that voltage) may be fed back to the controller 10. Further signals, which represent the inductor current $i_L$ and the output voltage may be fed back to the controller 10, if used for the control of the switching operation of the power converter. The control law, i.e. the functionality of the controller 10 is discussed later herein.

One important parameter, which is relevant to the performance of the SPMS circuit, is the energy conversion efficiency η, which can be calculated from the ratio between output power $P_{OUT}$ and input power $P_{IN}$:

$$\eta = P_{OUT}/P_{IN} = (V_{OUT}/V_{IN}) \cdot (i_{OUT}/i_{IN}).$$

In many applications, the output voltage is regulated in accordance with a given set-point and the ratio $V_{OUT}/V_{IN}$ does not change much. However, the output current $i_{OUT}$ may vary within a comparably wide range, and the energy conversion efficiency is not constant but depends on the output current $i_{OUT}$. Nevertheless, it is a design goal to achieve good efficiency throughout the full output current range.

The load (symbolized in FIG. 1 by the resistor $R_L$ connected between the output terminal OUT and ground GND) may, for example, draw a nominal output $i_{OUT}$ current during normal operation and a minimum current in standby mode or power-saving mode. Therefore, the minimum output current drawn from the SMPS may be only a small fraction (e.g. less than 1 per mil) of the nominal output current.

For high output currents, the energy conversion efficiency is mainly determined by the on-state resistance $R_{ON}$ of the transistors $T_{HS}$ and $T_{LS}$ used in the switching power converter. As the power loss caused by the (non-zero) on-state resistance $R_{ON}$ is substantially proportional to the resistance $R_{ON}$, the transistors $T_{HS}$ and $T_{LS}$ are designed to have an on-state resistance low enough to achieve a desired (high) energy conversion efficiency. A low on-state resistance usually entails a large active transistor area (e.g., a transistor composed of a high number of transistor cells that contribute to the active transistor area), and large transistors entail high parasitic capacitances. These parasitic capacitances are also illustrated in FIG. 1 for the low-side transistor. Accordingly, a parasitic capacitance $C_{DS}$ is present between drain and source of transistor $T_{LS}$. That is, a parasitic capacitor having a capacitance $C_{DS}$ is coupled parallel to the drain-source current path of transistor $T_{LS}$. Another parasitic capacitance $C_{GD}$ is present between gate and drain of transistor $T_{LS}$.

For low output currents, the energy conversion efficiency is mainly determined by the power losses caused by the charging and discharging of the parasitic capacitances. A field plate structure included in a power MOSFET also contributes to the parasitic capacitance. The capacitance $C_{FP}$ of the field plate has a series resistance $R_{FP}$ and, accordingly, a series circuit of a capacitor (capacitance $C_{FP}$)) and a resistor (resistance $R_{FP}$) coupled between drain and source of transistor $T_{LS}$ models the presence of the field plate. Finally, a gate-source capacitance $C_{GS}$ is illustrated in FIG. 1 as well as the intrinsic reverse diode $D_R$. Although not explicitly shown in FIG. 1, all these parasitic elements are also present in the high-side transistor $T_{HS}$.

Figure 2:
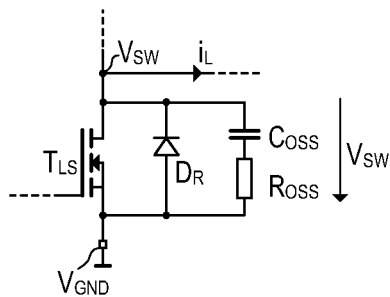
FIG. 2 illustrates a model of the low side transistor used in the circuit of FIG. 1, wherein the parasitic capacitances and resistances are modeled using capacitor-resistor series circuit.

FIG. 2 illustrates an equivalent circuit for the low side transistor $T_{LS}$ of FIG. 1. The parasitic components $C_{GD}$, $C_{DS}$, $C_{FG}$ and $R_{FP}$ are replaced by a series circuit of an effective capacitor $C_{OSS}$ and an effective series resistor $R_{OSS}$ coupled parallel to the drain-source current path of transistor $T_{LS}$. One can see that the capacitor $C_{OSS}$ can be charged via two different current paths, if the transistor $T_{LS}$ is off and the voltage $V_{SW}$ at the half bridge output node is low. First, the capacitor $C_{OSS}$ can be charged by the inductor current $i_L$ if the inductor current $i_L$ is negative (the arrow in FIG. 2 indicates the direction of the current flow for a positive inductor current). Second, the capacitor $C_{OSS}$ can be charged via the drain-source current path of the high-side transistor $T_{HS}$ as soon as the high-side transistor $T_{HS}$ is activated. These two charging mechanisms differ in the losses, which occur during the charging, and have some impact on the achievable energy conversion efficiency. However, the details of these charging mechanisms will be discussed later.

Figure 3:
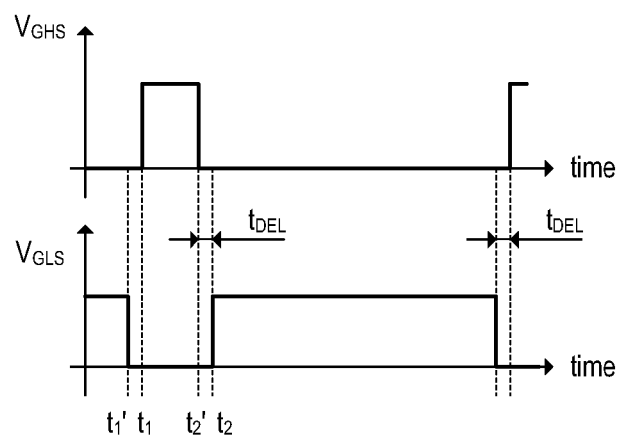
FIG. 3 includes timing diagrams, which illustrate the gate signals of the semiconductor switches of the buck converter of FIG. 1.

Another cause of losses, which may reduce the overall energy conversion efficiency, is a dead time (delay time) between deactivation (switch-off) of one switch of the half-bridge (e.g. switch-off of the high-side switch $T_{HS}$) and the subsequent activation (Switch-on) of the other switch of the half-bridge (e.g. switch-on of the low-side switch $T_{LS}$). During this dead times, which are labelled as $T_{DEL}$ in FIG. 3, current passes through the intrinsic reverse diode (see diode $D_R$ in FIG. 1) instead of the MOS channel of the transistor. Due to the power losses in the reverse diode $D_R$ modern controller circuits (see FIG. 1, controller circuit 10) may be designed to minimize the delay time, which are therefore extremely short and in the range of a few nanoseconds. However, the dead time $T_{DEL}$ cannot be reduced to zero in order to avoid cross-conduction through the transistor half bridge. That is, the controller circuit 10 shown in FIG. 1 may be configured to tune the dead time value to be as short as possible while avoiding cross conduction through the half-bridge. This minimum dead time value is not necessarily constant throughout the operation of the switching power converter but may vary dependent on the operating state of the converter, e.g. dependent on the load connected to the power converter output.

As explained above, the minimum dead times $T_{DEL}$, which can be achieved by modern controller circuits for power converters, are good for avoiding losses in the intrinsic reverse diode of the low side switch $T_{LS}$. However, the short dead times may have a negative impact on the losses occurring when charging the parasitic capacitors represented by the capacitor $C_{OSS}$ in FIG. 2.

Reference is again made to FIGS. 2 and 3. When the low-side switch $T_{LS}$ is switched off at time instant $t_1$, the parasitic capacitances represented by capacitor $C_{OSS}$ can be charged either by a negative inductor current $i_L$ (wherein the inductor acts as a current source) before the high side switch $T_{HS}$ is activated, or by the input voltage source (providing the input voltage $V_{IN}$) via the high-side switch $T_{HS}$ after the high side switch $T_{HS}$ is activated (at time $t_1$'). A negative inductor current $i_L$ occurs when operating in CCM and the output current $i_{OUT}$ is lower than half the peak-to-peak current $i_{LPP}$ value of the inductor current $i_L$ (see also bottom diagram of FIG. 4). When the low side switch $T_{LS}$ is switched off at time $t_1$, the only available current path for the inductor current $i_L$ is via the (parasitic) capacitor $C_{OSS}$ and thus the inductor $L_{OUT}$ (which approximately acts as current source) charges capacitor $C_{OSS}$. This charging mechanism entails only little losses. However, as soon as the high side switch $T_{HS}$ is activated, the capacitor $C_{OSS}$ is further charged via the current passing through the high side switch $T_{HS}$. The current charging capacitor $C_{OSS}$ is significantly higher in this case and comparably high losses in the resistances in the current path between the input voltage source and the capacitance $C_{OSS}$ occur. One simple approximation yields losses $E_C$ of $E_C = C_{OSS} \cdot V_{IN}^2 / 2$ in each switching cycle during operation in CCM. In a system optimized for higher load currents, the usual dead time $T_{DEL}$ is so short that the charge stored in the capacitor $C_{OSS}$ due to accumulation of the negative inductor current is practically negligible.

In order to avoid the mentioned losses $E_C$ in each switching cycle, the controller 10 may be configured to ensure that, when the inductor current $i_L$ is negative in CCM, the delay time between time instances $t_1$ and $t_1$' is set to a value high enough to allow the voltage $V_{SW}$ at the half-bridge output node (see FIG. 2) to rise to approximately $V_{IN} + V_{DR}$, wherein $V_{DR}$ denotes the forward voltage of the intrinsic body diode (reverse diode) of the high side switch $T_{HS}$ (not shown in FIG. 1). For example, in case of an input voltage $V_{IN}$ of $V_{IN} = 12V$, the dead time $T_{DEL} = t_1' - t_1$ is set such that the negative inductor current $i_L$ can charge the capacitor $C_{OSS}$ until the voltage $V_{SW}$ reaches $V_{IN} + V_{DR} = 12.7$ V. This condition defines a minimum value for the dead time. For example, the (short) standard dead time is at least doubled, in order to allow the negative inductor current $i_L$ to charge capacitor $C_{OSS}$. In one investigated example, the standard minimum delay time of approximately five nanoseconds has been increased to 20 nanoseconds in case of a negative inductor current $i_L$ during CCM. Without increasing the short standard dead time, the capacitor $C_{OSS}$ is mainly charged via the low inductance current path from the input voltage source via the high side switch $T_{HS}$ to the capacitor $C_{OSS}$, wherein the voltage $V_{SW}$ rises fast and a significant overshoot occurs in the drain-source voltage $V_{DSLS}$ of the low-side switch $T_{LS}$ (equals voltage $V_{SW}$) with a subsequent damped oscillation (ringing), wherein most of the energy is dissipated during the oscillation (ringing). This situation is illustrated in the fourth timing diagram (counted from the top) of FIG. 4, which illustrates the drain-source-voltage $V_{DSLS}$ of the low side switch over time. When increasing the dead time as explained above, the overshoot and the oscillations can be significantly reduced, and thus the energy conversion efficiency can be improved.

Figure 4:
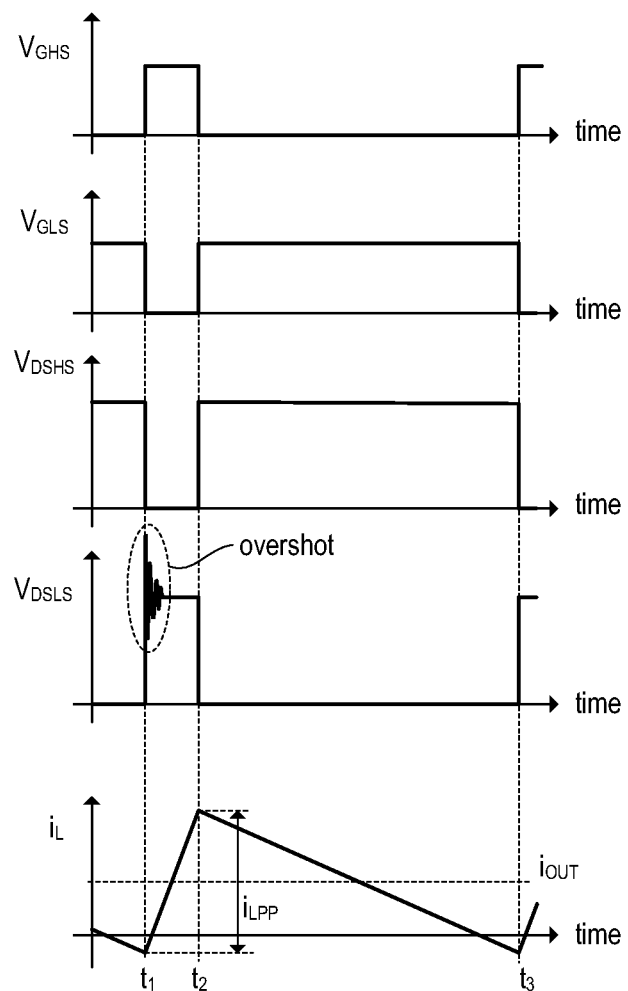
FIG. 4 includes timing diagrams, which illustrates the gate voltages and the drain-source voltages of the semiconductor switches and the inductor current of the buck converter of FIG. 1 when operated in continuous current mode (CCM)

The timing diagrams of FIG. 4 illustrate the waveforms of the gate-source voltages $VG_{HS}$, $VG_{LS}$, the drain-source voltages $V_{DSHS}$, $V_{DSLS}$, and the inductor current $i_L$ occurring in the switching power converter of FIG. 1 in CCM for a low output current $i_{OUT}$ ($i_{OUT} < i_{LPP}/2$). The semiconductor switches are switched on and off with a fixed frequency $f_{SW}$. That is, the switching converter is driven with pulse width modulated gate signals (gate voltages $V_{GHS}$, $V_{GLS}$), wherein the gate-source voltage signals $V_{GHS}$, $V_{GLS}$ are essentially inverse to each other (except for the dead times $T_{DEL}$ not shown in FIG. 4). At time instant $t_1$ the low side transistor $T_{LS}$ is switched off and (a short delay time later) the high side transistor $T_{HS}$ is switched on. The respective gate voltages $V_{GLS}$, $V_{GHS}$ have corresponding high-low and low-high transitions (see the first and the second timing diagram of FIG. 4). At time instant $t_2$, the high side transistor $T_{HS}$ is switched off and the low side transistor $T_{LS}$ is switched on again. As a result, the drain-source voltage $V_{DSHS}$ of the high side transistor $T_{HS}$ drops from approximately $V_{IN}$ to approximately zero at time instant $t_1$ and rises again to $V_{IN}$ at time instant $t_2$. Similarly, the drain-source voltage $V_{DSLS}$ of the low side transistor $T_{LS}$ rises from approximately zero to approximately $V_{IN}$ at time instant $t_1$ and drops again to zero at time instant $t_2$. As already discussed above, a significant overshoot and ringing (oscillation) may occur at the rising edge in the voltage signal $V_{DSLS}$.

As mentioned, the phenomenon of excessive overshoots and oscillations is particularly problematic at low output currents. When the power converter is operated with a light load (small output current), the losses resulting from charging the capacitor $C_{OSS}$ (in each switching cycle) are a significant contribution to the total losses and thus have a significant impact in the energy conversion efficiency. This problem can be alleviated by "pre-charging" the parasitic capacitors (represented by capacitor $C_{OSS}$, see FIG. 2) with the inductor current $i_L$. Such pre-charging is possible when the inductor current $i_L$ is negative at the time (time instant $t_1$ in FIG. 4) the low side switch $T_{LS}$ is deactivated, and the inductor current $i_L$ will be negative at that time instant when the output current $i_{OUT}$ is lower than half of the peak-to-peak value $i_{LPP}$ of the inductor current ($i_{OUT} < i_{LPP}/2$). This situation is illustrated in the bottom diagram of FIG. 4.

The pre-charging of the capacitor $C_{OSS}$ will generally take more time than the "normal" delay time (see dead time $T_{DEL}$ in FIG. 2) between switch-off of low side transistors. To allow the pre-charging of the capacitor $C_{OSS}$ (and to avoid the losses caused by an incomplete pre-charging) the controller 10 (see FIG. 1) of the switching power converter may be configured to detect, whether or not the inductor current $i_L$ becomes negative before the low-side switch $T_{LS}$ is switched off. When a change of the sign of the inductor current is detected and the inductor current $i_L$ is negative at the time the low side switch $T_{LS}$ is switched off, then the controller 10 may use an increased delay time $T_{DEL}$ between switch-off of the low-side transistor $T_{LS}$ and subsequent switch-on of the high side-transistor $T_{HS}$. That is, the delay time is increased (e.g. to 20 ns) as compared to the short delay time (e.g. 5 ns) used when the inductor current $i_L$ does not change its sign (i.e. at higher output currents). When the controller 10 then detects (in another switching cycle) that the inductor current $i_L$ has not changed the sign and is (again) positive at the time the low-side switch $T_{LS}$ is switched off, then the normal (short) delay time is used.

Figure 5:
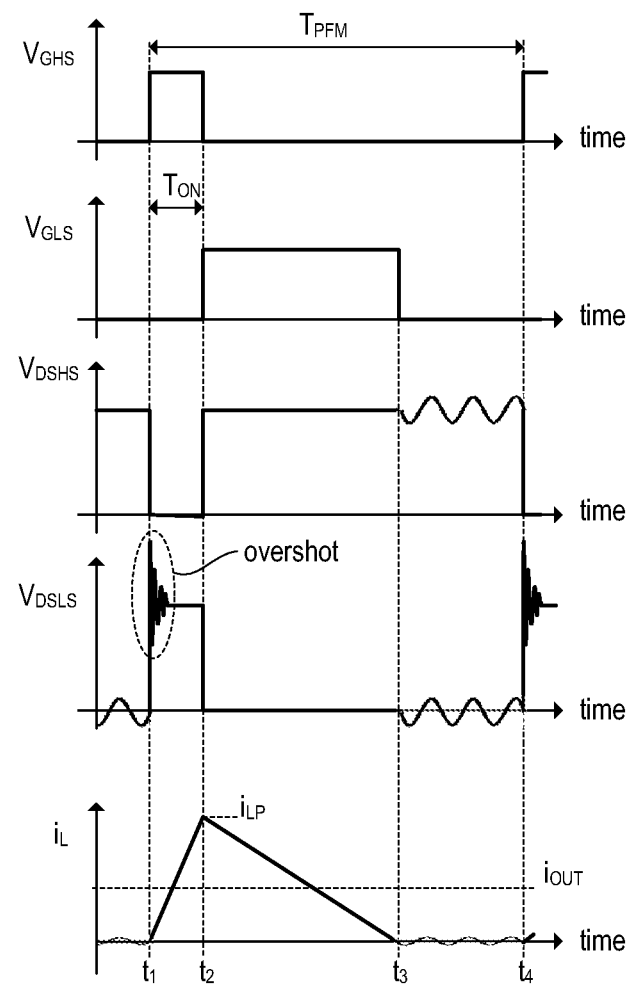
FIG. 5 includes timing diagrams, which illustrates the gate voltages and the drain-source voltages of the semiconductor switches and the inductor current of the buck converter of FIG. 1 when operated in discontinuous current mode (DCM)
Figure 6:
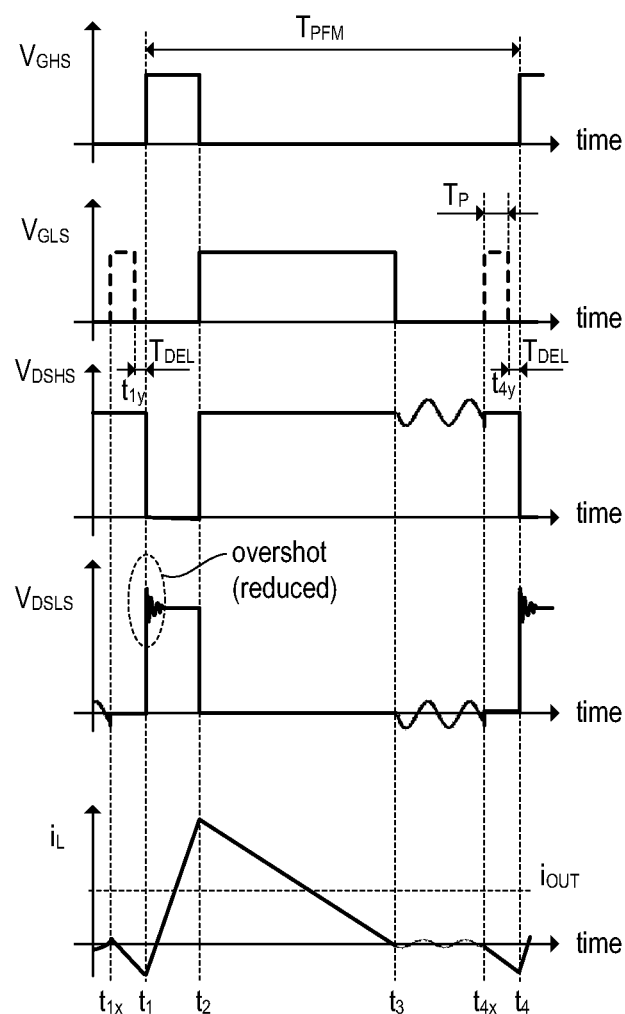
FIG. 6 includes timing diagrams, which illustrates the gate voltages and the drain-source voltages of the semiconductor switches and the inductor current of the buck converter of FIG. 1 when operated in a modified discontinuous current mode (DCM) in accordance with one embodiment.

As discussed above, a negative inductor current $i_L$ usually occurs when the power converter is operated in continuous conduction mode (CCM) and the current consumption of the load supplied by the power converter is low. In CCM, the power converter is usually operated at a constant switching frequency and the power semiconductor switches (see FIG. 1, switches $T_{HS}$, $T_{LS}$) are switched on and off in accordance with a pulse-width modulated (PWM) signal. However, many SMPS use controllers (see FIG. 1, controller 10) which change the mode of operation to discontinuous current mode (DCM) when the output current $i_{OUT}$ is low. In DCM, the high-side switch $T_{HS}$ (see FIG. 1) is on for a defined duration (pulse width) and the switching frequency (pulse frequency) is varied to maintain the output voltage $V_{OUT}$ at the set-point. This type of modulation is called pulse frequency modulation (PFM). These operating modes (PWM/CCM, PFM/DCM) are as such known and thus not further discussed here in more detail. However, for the embodiments described herein it has to be considered that, in DCM, the inductor current $i_L$ falls from its peak value to approximately zero and does not significantly drop further to negative values. Therefore, the pre-charging of the parasitic capacitor $C_{OSS}$ (see FIG. 2) using a negative inductor current is not possible in DCM without further modifications. The timing diagrams of FIG. 5 illustrated the signals present in the switching converter of FIG. 1 when operated conventionally in DCM. FIG. 6 illustrates timing diagrams of the same signals when the switching converter is operated in accordance with one exemplary embodiment.

The timing diagrams of FIG. 5 illustrate the waveforms of the gate-source voltages $V_{GHS}$, $V_{GLS}$, the drain-source voltages $V_{DSHS}$, $V_{DSLS}$, and the inductor current $i_L$ occurring in the switching power converter of FIG. 1 in DCM. The gate-source voltages $V_{GHS}$ and $V_{GLS}$ are set to high levels to switch the respective switches on, and reset to low levels to switch the respective switches off (see FIG. 5, first and second timing diagram). The high side switch $T_{HS}$ is switched on (see time instants $t_1$ and $t_4$ in FIG. 5) for a defined on time $T_{ON}$ or until the inductor current reaches a defined peak value $i_{LP}$ (ramping up from approximately zero amperes). The corresponding waveform of the inductor current is illustrated in the bottom diagram of FIG. 5. At time instant $t_2$, the high side switch $T_{HS}$ is switched off and the low side switch $T_{LS}$ is switched on. As a result, the inductor current starts to ramp down until it reaches zero at time instant $t_3$. When the inductor current reaches zero, the low side switch $T_{LS}$ is also switched off and the half-bridge formed by the switches $T_{HS}$ and $T_{LS}$ assumes a high impedance state. When the cycle time $T_{PFM}$ has elapsed at time instant $t_4$, the high-side switch $T_{HS}$ is switched on and the next switching cycle begins.

While the half-bridge is in the high-impedance state (both switches off), the drain-source voltages $V_{DSHS}$ and $V_{DSLS}$ oscillate due to parasitic capacitances and inductances. However, these oscillations do not cause significant losses. Similar to CCM (see FIG. 4) the drain-source voltage $V_{DSLS}$ of the low-side switch $T_{LS}$ (corresponds to the voltage $V_{SW}$, see FIG. 1) exhibits a strong overshoot and oscillations at time instant $t_1$, i.e. when the high side switch $T_{HS}$ is activated (switched on). This overshoot and the subsequent oscillations occur for the same reason as in CCM which has been discussed above with respect to FIG. 4. Accordingly, a negative inductor current $i_L$ is not available for pre-charging the parasitic capacitor $C_{OSS}$ and, as a consequence, the overshoot and the oscillations occur directly after a rising edge in the voltage $V_{DSLS}$. The problem caused by the overshoot and the subsequent oscillations (i.e. the losses resulting therefrom) can be alleviated and the resulting losses can be reduced by controlling the switching converter in DCM such that a pre-charging can be accomplished similar to the previous case (CCM) discussed.

To enable the pre-charging of the parasitic capacitor $C_{OSS}$ in DCM, the inductor current $i_L$ is caused to become negative during a short time interval directly preceding the time instant $t_1$, at which the high side switch $T_{HS}$ is switched on. The negative inductor current $i_L$ may be caused be shortly (re-) activating the low side switch $T_{LS}$ before the time instant $t_1$ as shown in FIG. 6 (see dashed line in the second timing diagram of FIG. 6). The dead time $T_{DEL}$ (see also FIG. 2) between the switch-off of the low-side switch $T_{LS}$ and the switch-on of the high-side switch $T_{HS}$ (at time instant $t_1$) is chosen such, that the parasitic capacitor $C_{OSS}$ can accumulate sufficient charge from the inductor $L_{OUT}$ in the same way as discussed above with respect to CCM.

Similar to FIG. 5, the timing diagrams of FIG. 6 illustrate the waveforms of the gate-source voltages $V_{GHS}$, $V_{GLS}$, the drain-source voltages $V_{DSHS}$, $V_{DSLS}$, and the inductor current $i_L$ occurring in the switching power converter of FIG. 1 in DCM. Different from the example of FIG. 5, additional pulses (dashed lines in the second diagram of FIG. 6) are included in the gate voltage signal $V_{GLS}$ of the low side switch $T_{LS}$. These additional pulses precede the time instances $t_1$ and $t_4$ at which the high side switch $T_{HS}$ is activated (cf. the gate voltage signal $V_{GHS}$ in the top diagram of FIG. 6). In the example of FIG. 6, the additional pulses start at time instances $t_{1x}$ and $t_{4x}$ and have a pulse width of $T_P$. As a result, the inductor current $i_L$ drops to negative values during the time intervals between $t_{1x}$ and $t_1$ as well as between $t_{4x}$ and $t_4$. When the low side switch $T_{LS}$ is switched off again shortly before the high side switch $T_{HS}$ is switched on, the negative inductor current $i_L$ (see bottom diagram of FIG. 6) charges the parasitic capacitor $C_{OSS}$ (see FIGS. 1 and 2) at comparably low losses. The remaining dead time $T_{DEL}$ between the switch-off of the low-side switch $T_{LS}$ (times $t_{1y}$ and $t_{4y}$) and the switch-on of the high side switch $T_{HS}$ is set to be long enough to allow the capacitor $C_{OSS}$ to be charged to a voltage $V_{IN}+V_{DR}$ as explained above for CCM. As mentioned before, this condition defines a minimum value for the dead time $T_{DEL}$.

Figure 7:
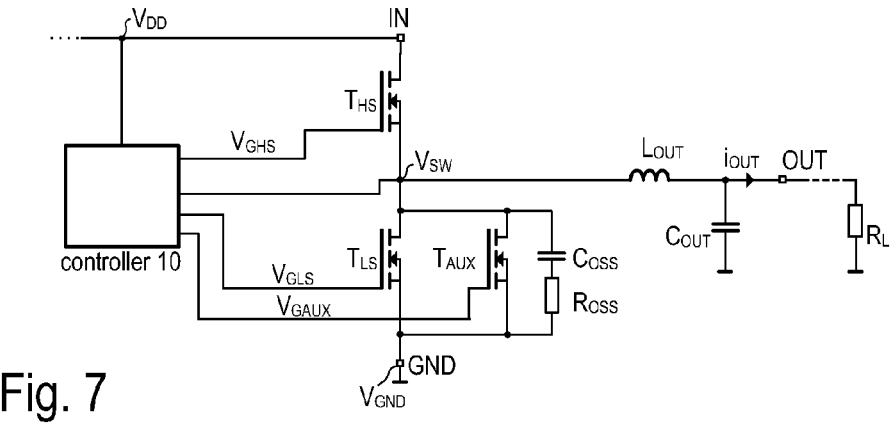
FIG. 7 illustrates another exemplary embodiment of a switched mode power supply (SMPS) circuit including a buck converter with a synchronous rectifier.

When activating the low-side switch $T_{LS}$ between time instants $t_{1x}$ and $t_{1y}$ (see FIG. 6, second and fourth timing diagram), it is not necessary to activate all transistor cells of the power MOSFET forming the low side switch. Instead, only a small fraction (e.g., approximately 3 percent) of the transistor cells may be activated in order to avoid unnecessary losses due to the charging of the gate. Alternatively, a small auxiliary switch $T_{AUX}$ can be used, whose drain-source-current path is coupled parallel to the drain-source current path of the power MOSFET forming the low-side switch $T_{LS}$. This situation is illustrated in FIG. 7, which is essentially identical to the example of FIG. 1, except that it includes the mentioned auxiliary switch $T_{AUX}$ and the parasitic capacitors and resistors have been replaced by the effective capacitor $C_{OSS}$ and the effective resistor $R_{OSS}$ as explained with reference to FIG. 2. In the example of FIG. 7 the controller circuit 10 and the auxiliary switch $T_{AUX}$ are shown as separate components. However, the auxiliary switch $T_{AUX}$ may readily be integrated in the controller circuit 10. The controller circuit (with or without the auxiliary switch) may be provided in one or more semiconductor dies integrated in a single chip package. Thus, the circuitry needed for operating the switching converter may be provided in one device (chip).

Figure 8:
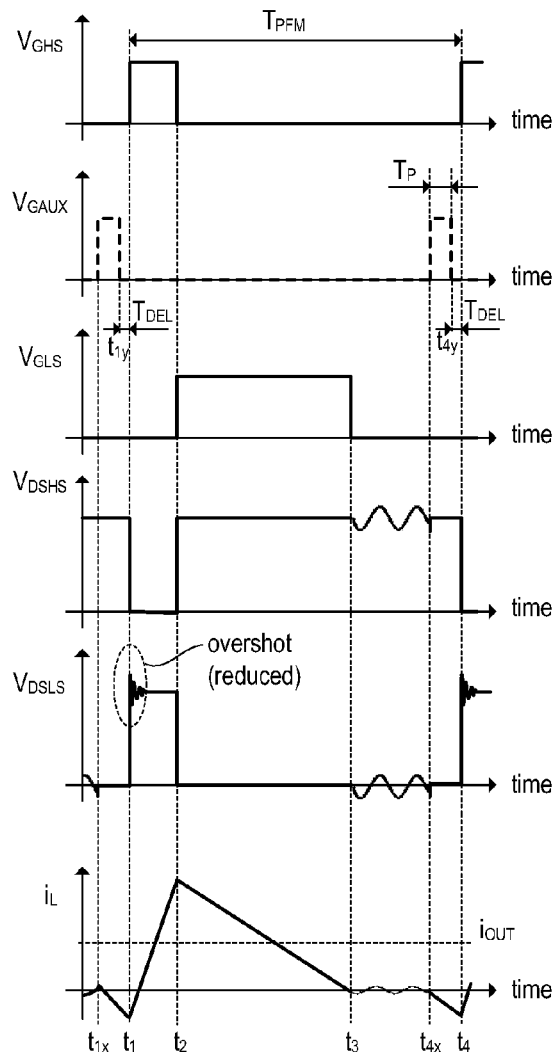
FIG. 8 includes timing diagrams, which illustrates the gate voltages and the drain-source voltages of the semiconductor switches and the inductor current of the buck converter of FIG. 7 when operated in a modified discontinuous current mode (DCM) in accordance with one embodiment.

FIG. 8 includes timing diagrams similar to FIG. 6. Accordingly, FIG. 8 illustrates the waveforms of the gate-source voltages $V_{GHS}$, $V_{GLS}$, and $V_{GAUX}$ the drain-source voltages $V_{DSHS}$, $V_{DSLS}$, and the inductor current $i_L$ occurring in the switching power converter of FIG. 7 in DCM. The waveforms shown in FIG. 8 are identical to the waveforms previously shown in FIG. 6 except that the additional pulses, which are drawn as dashed lines in the second diagram of FIG. 6, are not included in the gate voltage signal $V_{GLS}$ of the low side switch $T_{LS}$ but in a separate gate signal $V_{GAUX}$ applied to the gate of the auxiliary switch $T_{AUX}$ (see FIG. 7). These additional pulses precede the time instances $t_1$ and $t_4$ at which the high side switch $T_{HS}$ is activated (cf. the gate voltage signal $V_{GHS}$ in the top diagram of FIG. 8). In the present example, the additional pulses start at time instances $t_{1x}$ and $t_{1x}$ and have a pulse width of $T_P$. As a result, the inductor current $i_L$ drops to negative values during the time intervals between $t_{1x}$ and $t_1$ as well as between $t_{4x}$ and $t_4$. When the auxiliary switch $T_{AUX}$ is switched off again shortly before the high side switch $T_{HS}$ is switched on, the negative inductor current $i_L$ (see bottom diagram of FIG. 8) charges the parasitic capacitor $C_{OSS}$ (see FIGS. 1 and 2) at comparably low losses. The remaining dead time $T_{DEL}$ between the switch-off of the auxiliary switch $T_{AUX}$ (times $t_{1y}$ and $t_{4y}$) and the switch-on of the high side switch $T_{HS}$ is set to be long enough to allow the capacitor $C_{OSS}$ to be charged to a voltage $V_{IN}+V_{DR}$ as explained above for CCM. In essence, the power converter operates in the same manner as described with reference to FIG. 6 except that the operation of the low-side switch $T_{LS}$ is "distributed" among low-side switch $T_{LS}$ (which is a power transistor like the high side switch $T_{HS}$) and the auxiliary switch $T_{AUX}$, whose load current path (drain-source path) is connected parallel to the low-side switch $T_{LS}$.

While various embodiments of the invention have been described, it will be apparent to those of ordinary skill in the art that many more embodiments and implementations are possible within the scope of the invention. Accordingly, the invention is not to be restricted except in light of the attached claims and their equivalents. With regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A circuit comprising:
    a switching power converter comprising:
        a half bridge comprising a high-side semiconductor switch connected to a low-side semiconductor switch; and
        an inductor coupled to a half bridge output node; and
    a controller configured to generate drive signals to switch the high-side switch and the low-side switch on and off for operating the switching power converter in continuous conduction mode (CCM),
    wherein the drive signals are generated to ensure a dead time between a switch-off of the low-side switch and a subsequent switch-on of the high-side switch, and
    wherein, in CCM, the dead time is set to a first value, when an inductor current is negative at a time of switching, and the dead time is set to a second value, which is lower than the first value, when the inductor current is positive at the time of switching.

2. The circuit of claim 1, wherein the controller is further configured to generate drive signals to operate the switching power converter in a discontinuous conduction mode (DCM).

3. The circuit of claim 2, wherein the controller is further configured to detect, when the controller operates the switching converter in the CCM, whether or not the inductor current is negative, and to set the dead time to the first value when the inductor current has been detected as negative.

4. The circuit of claim 3, wherein the controller is further configured to set the dead time to the second value when the inductor current has been detected as positive.

5. The circuit of claim 2, wherein the controller is further configured to generate, when the controller operates the switching converter in the DCM and the inductor current is substantially zero, a drive signal to switch on the low-side switch for a given time interval, thus causing the inductor current to become negative.

6. The circuit of claim 2, wherein the low-side switch is a transistor composed of a plurality of transistor cells, and wherein the controller is further configured to generate, when the controller operates the switching converter in the DCM and the inductor current is substantially zero, a drive signal to switch on a portion of the transistor cells of the low-side switch for a given time interval, thus causing the inductor current to become negative.

7. The circuit of claim 2, wherein the low-side switch comprises a transistor and an auxiliary switch coupled parallel to the transistor, and wherein the controller is further configured to generate, when the controller operates the switching converter in the DCM and the inductor current is substantially zero, a drive signal to switch on the auxiliary switch for a given time interval, thus causing the inductor current to become negative.

8. The circuit of claim 7, wherein the auxiliary switch and the controller are integrated in the same semiconductor die or the same chip package.

9. The circuit of claim 7, wherein the dead time between switch-off of the auxiliary switch and the subsequent switch-on of the high-side switch is set to the first value.

10. The circuit of claim 1, wherein the switching power converter is a buck converter.

11. The circuit of claim 1, wherein the controller is configured to tune the second value to be as short as possible while avoiding cross conduction through the half bridge.

12. A circuit comprising:
a switching power converter comprising:
a half bridge comprising a high-side semiconductor switch connected to a low-side semiconductor switch, wherein the low-side switch comprises a low-side transistor and an auxiliary transistor, and wherein the auxiliary transistor is coupled parallel to the low side transistor;
an inductor coupled to a half bridge output node; and
a controller configured to generate drive signals to switch the high-side semiconductor switch and the low-side transistor on and off to operate the switching converter in at least one of: a continuous conduction mode (CCM) and a discontinuous conduction mode (DCM),
wherein, when operating in the CCM, the drive signals are generated to ensure a dead time between a switch-off of the low-side transistor and a subsequent switch-on of the high-side switch,
wherein the dead time is set to a first value, when an inductor current is negative at a time of switching, and the dead time is set to a second value, which is lower than the first value, when the inductor current is positive at the time of switching, or
wherein, when operating in the DCM and the inductor current is substantially zero, a drive signal is generated to switch on the auxiliary transistor for a given time interval, thus causing the inductor current to become negative, wherein the drive signals are generated to ensure a dead time of the first value between a switch-off of the auxiliary transistor and a subsequent switch-on of the high-side switch.

13. A method for operating a switching power converter, the switching power converter comprising a half bridge including a high-side semiconductor switch connected to a low-side semiconductor switch, and an inductor coupled to a half bridge output node, the method comprising:
generating drive signals to switch the high-side semiconductor switch and the low-side semiconductor switch on and off for operating the switching converter in at least one of: a continuous conduction mode (CCM) and a discontinuous conduction mode (DCM),
wherein the drive signals are generated to ensure a dead time between a switch-off of the low-side switch and a subsequent switch-on of the high-side switch, and
wherein, when operating in CCM, the dead time is set to a first value, when an inductor current is negative at a time of switching, and the dead time is set to a second value, which is lower than the first value, when the inductor current is positive at the time of switching.

14. The method of claim 13, further comprising tuning the second value to be as short as possible while avoiding cross conduction through the half bridge.

15. The method of claim 13, further comprising detecting, while the switching power converter operates in the CCM, whether or not the inductor current is negative, and to set the dead time to the first value when the inductor current has been detected as negative.

16. The method of claim 15, further comprising setting the dead time to the second value when the inductor current has been detected as positive.

17. The method of claim 13, further comprising generating, while the switching power converter operates in the DCM and the inductor current is substantially zero, a drive signal to switch on the low-side switch for a given time interval, thus causing the inductor current to become negative.

18. The method of claim 13, wherein the low-side switch is a transistor comprising a plurality of transistor cells, the method further comprising generating, while the switching power converter operates in the DCM and the inductor current is substantially zero, a drive signal to switch on a portion of the transistor cells of the low-side switch for a given time interval, thus causing the inductor current to become negative.

19. The method of claim 13, wherein the low-side switch comprises a transistor and an auxiliary switch, the auxiliary switch being coupled parallel to the transistor, the method further comprising generating, when the switching power converter operates in the DCM and the inductor current is substantially zero, a drive signal to switch the auxiliary switch for a given time interval, thus causing the inductor current to become negative.

20. A circuit comprising:
a switching power converter comprising:
a half bridge comprising a high-side semiconductor switch connected to a low-side semiconductor switch; and
an inductor coupled to a half bridge output node; and
a controller configured to generate drive signals to switch the high-side semiconductor switch and the low-side semiconductor switch on and off to operate the switching power converter in discontinuous conduction mode (DCM),
wherein, in DCM, the controller is further configured to generate, while an inductor current is substantially zero, a drive signal to switch on the low-side switch, or an auxiliary switch coupled parallel to the low-side switch, for a given time interval, thus causing the inductor current to become negative, and wherein to switch on comprises to switch the low-side switch or the auxiliary switch from off to on.

21. The circuit of claim 20, wherein the drive signals are generated to ensure a dead time between a switch-off of the low-side switch and a subsequent switch-on of the high-side switch, and wherein the dead time is set to a first value, when an inductor current is negative at a time of switching, and the dead time is set to a second value, which is lower than the first value, when the inductor current is positive at the time of switching.

22. The circuit of claim 20, wherein the low-side switch is a transistor composed of a plurality of transistor cells, and wherein the controller is further configured to generate, when the controller operates the switching converter in the DCM and the inductor current is substantially zero, a drive signal to switch on a portion of the transistor cells of the low-side switch for a given time interval, thus causing the inductor current to become negative.

* * * * *